United States Patent
Ma et al.

(10) Patent No.: US 8,077,975 B2
(45) Date of Patent: Dec. 13, 2011

(54) HANDWRITING SYMBOL RECOGNITION ACCURACY USING SPEECH INPUT

(75) Inventors: Lei Ma, Beijing (CN); Yu Shi, Beijing (CN); Frank Kao-ping Soong, Warren, NJ (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 12/037,095

(22) Filed: Feb. 26, 2008

(65) Prior Publication Data

US 2009/0214117 A1    Aug. 27, 2009

(51) Int. Cl.
*G06K 9/00* (2006.01)
*G06K 9/62* (2006.01)
*G06K 9/72* (2006.01)
*G06F 3/00* (2006.01)
*G10L 15/26* (2006.01)
*G09G 5/00* (2006.01)

(52) U.S. Cl. ........ 382/187; 382/228; 382/229; 715/708; 704/255; 345/156

(58) Field of Classification Search .................. 382/182, 382/187, 228, 229; 345/156; 715/708; 704/255
See application file for complete search history.

(56) References Cited

U.S. PATENT DOCUMENTS

| | | | |
|---|---|---|---|
| 6,285,785 B1 * | 9/2001 | Bellegarda et al. ........... | 382/187 |
| 2004/0015342 A1 | 1/2004 | Garst | |
| 2004/0054701 A1 | 3/2004 | Garst | |
| 2005/0128181 A1 | 6/2005 | Wang et al. | |
| 2006/0062467 A1 | 3/2006 | Zou et al. | |
| 2006/0127872 A1 | 6/2006 | Marggraff | |
| 2006/0290656 A1 * | 12/2006 | Soong et al. ................... | 345/156 |
| 2007/0046645 A1 * | 3/2007 | Hirota et al. ................... | 345/173 |
| 2007/0154116 A1 | 7/2007 | Shieh | |

OTHER PUBLICATIONS

Guy; et al., "Math Speak & Write, a Computer Program to Read and Hear Mathematical Input", Electrical Engineering and Computer Sciences Department, Univ. of Calif, Berkeley, Date: Aug. 2004, pp. 1-9.

Anthony; et al., "Evaluation of Multimodal Input for Entering Mathematical Equations on the Computer", Human Computer Interaction Institute, Carnegie Mellon University, 5000 Forbes Avenue, Pittsburgh, PA 15213, pp. 1-4.

Fateman, "Handwriting + Speech for Computer Entry of Mathematics—Work in Progress", Computer Science Division, University of California, Berkeley CA, pp. 1-13.

Anthony; et al., "Evaluation of Multimodal Input for Entering Mathematical Equations on the Computer", Human Computer Interaction Institute, Carnegie Mellon University, 5000 Forbes Avenue, Pittsburgh, PA 15213, pp. 1-4. 2005.

(Continued)

*Primary Examiner* — Kathleen Y Dulaney (57) ABSTRACT

Described is a bimodal data input technology by which handwriting recognition results are combined with speech recognition results to improve overall recognition accuracy. Handwriting data and speech data corresponding to mathematical symbols are received and processed (including being recognized) into respective graphs. A fusion mechanism uses the speech graph to enhance the handwriting graph, e.g., to better distinguish between similar handwritten symbols that are often misrecognized. The graphs include nodes representing symbols, and arcs between the nodes representing probability scores. When arcs in the first and second graphs are determined to match one another, such as aligned in time and associated with corresponding symbols, the probability score in the second graph for that arc is used to adjust the matching probability score in the first graph. Normalization and smoothing may be performed to correspond the graphs to one another and to control the influence of one graph on the other.

18 Claims, 7 Drawing Sheets

OTHER PUBLICATIONS

Fateman, "Handwriting + Speech for Computer Entry of Mathematics-Work in Progress", Computer Science Division, University of California, Berkeley CA, pp. 1-13. 2004.

Shi, Y. et al.; "A Unified Framework for Symbol Segmentation and Recognition of Handwritten Mathematical Expressions," ICDAR, vol. II, 2007; pp. 854-858.

* cited by examiner

HANDWRITING SYMBOL RECOGNITION ACCURACY USING SPEECH INPUT

BACKGROUND

Computerized recognition of handwritten math equations is a useful tool in many scenarios including educational and office automation environments. Typically, recognizing a math equation occurs in two stages, comprising a first, symbol segmentation and recognition stage, and a second, structural analysis stage. In general, the symbol segmentation and recognition stage determines possible boundaries for mathematical symbols, and recognizes the symbols as candidates. With the symbol boundaries and candidates, structural analysis is performed, which in general analyzes the equation's spatial structure and semantic construction.

However, the first stage suffers from recognition accuracy problems, in part because handwriting recognition has an inherent difficulty in discriminating between certain symbols. For example, handwriting recognizers often have difficulty differentiating between '6' and 'b', 'a' and 'α', 'w' and 'ω', and so forth. As computer users generally desire better and better recognition systems, any improvement in symbol recognition accuracy is beneficial.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a bimodal data input technology by which handwriting recognition results are combined with speech recognition results to improve overall recognition accuracy. In one aspect, handwriting data corresponding to mathematical symbols is received, along with speech input corresponding to at least one of those mathematical symbols. A handwriting recognizer processes the handwriting input into first recognition results, and a speech recognizer processes the speech input into second recognition results. A fusion mechanism uses the second recognition results to enhance the first recognition results, such as to better distinguish between handwritten symbols that are similar to one another and thus misrecognized relatively frequently.

In one aspect, the first and second recognition results each comprise a graph, including nodes representing symbols and arcs between nodes representing probability scores. When arcs in the first and second graphs are determined to match one another, the probability score in the second graph for that arc is used to adjust the matching probability score in the first graph, providing an enhanced graph. Matching may include time-alignment matching based on time information associated with each graph, as well as symbol matching based on the symbols represented by the nodes associated with the arcs.

In one aspect, the speech is recognized into a lattice form, which is then converted to a speech graph. The graphs are normalized in posterio probability sense so as to correspond to one another. The graphs may have their probability scores smoothed so that information in the speech graph is able to meaningfully influence the scores in the handwriting graph relative to other scores, and so that the speech graph's scores do not have too much influence.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a bimodal data entry system (e.g., in an interface) that combines speech and handwriting input for improving mathematical symbol recognition. In one example implementation, handwriting is used as a primary input modality for inputting a math equation, with speech used as a secondary input modality to aid in recognition; during the input process, speech can be partially or completely omitted. In general, because the different input modalities are orthogonal, many handwritten symbols that are often confused in handwriting recognition may be more clearly distinguished by the speech recognition.

While many of the examples described herein are directed towards example handwriting and speech recognizers that output results corresponding to graphs of candidates (nodes) and probabilities (arcs), it is understood that any suitable handwriting recognizer and/or speech recognizer may be used. Further, while many of the examples are directed towards using speech input received simultaneously or near-simultaneously with handwriting input, such that the speech can dynamically assist in recognition, it is understood that these are only examples. One alternative, for example, is for a user to enter symbols via handwritten electronic ink, select the electronic ink or corresponding recognition results at a later time, and use speech to correct any recognition errors. Still further, while recognition of mathematical symbols is exemplified herein, other types of data input may benefit from such bimodal recognition technology.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and recognition of input data in general.

Figure 1:
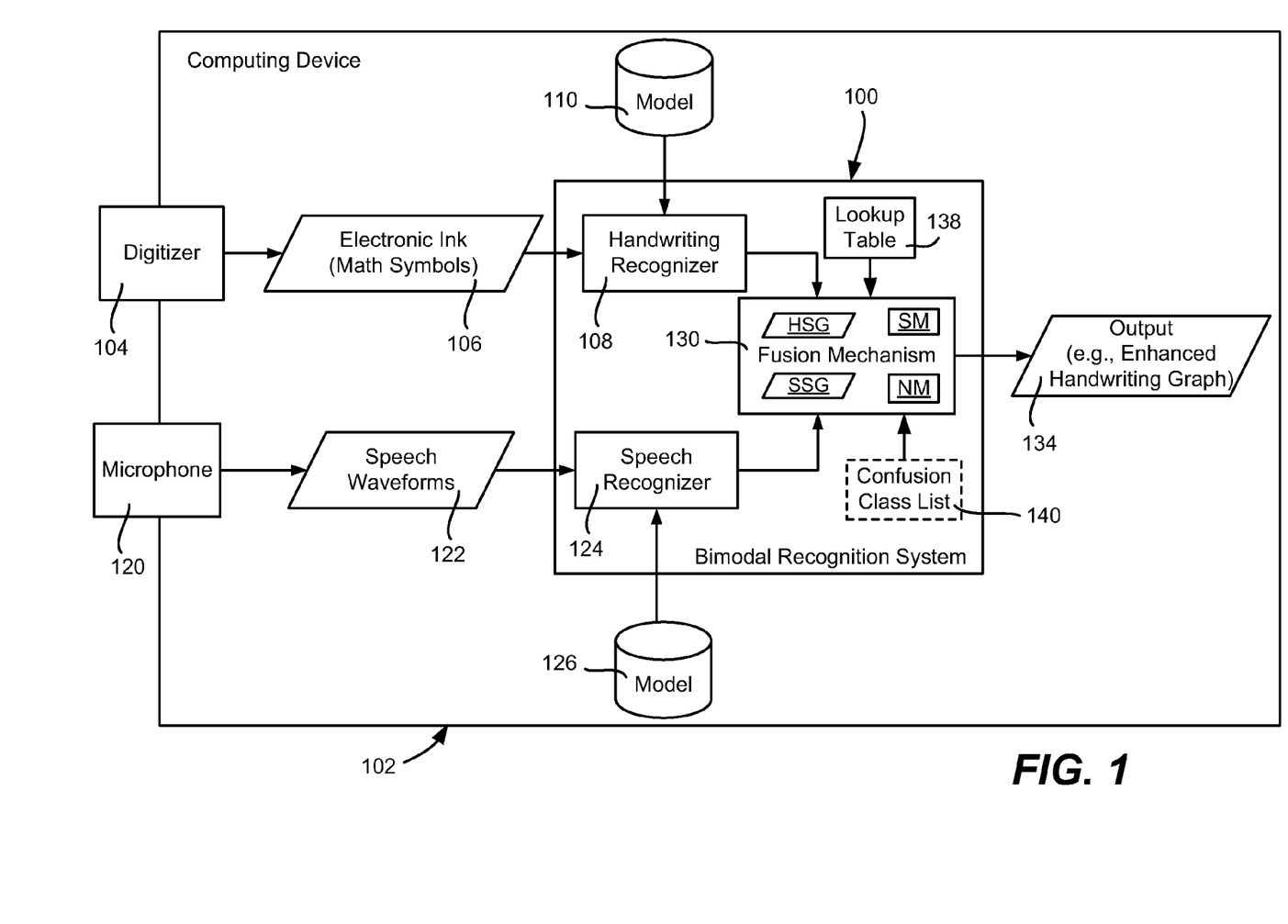
FIG. 1 is a block diagram representing example components including a bimodal recognition system that improves symbol recognition accuracy.

Turning to FIG. 1, an example bimodal input recognition system 100 is shown as being incorporated into a computing device 102. In general, a digitizer 104 provides electronic ink 106, such as intended for inputting mathematical symbols, to a handwriting recognizer 108. The digitizer 104 may comprise a tablet or other touch-sensitive mechanism integrated into the computing device 102, or may comprise a separate component coupled to the computing device 102. With the handwriting input, for example, the handwriting recognizer uses a trained recognition model 110 or the like to determine candidate symbols and boundaries, in which the candidate symbols are each assigned a score corresponding to a likelihood of being correct. In one implementation described below, this handwriting recognition result may be represented as a handwriting symbol graph (labeled HSG in FIG. 1).

In general, given a sequence of handwriting strokes, one type of recognizer is able to generate a handwriting symbol graph. One such recognizer is further described in the reference by Y. Shi, H.-Y. Li, and F. K. Soong, entitled "*A Unified Framework for Symbol Segmentation and Recognition of Handwritten Mathematical Expressions*," ICDAR, Vol II, pp. 854-858, 2007.

By way of a more particular example of a suitable handwriting recognizer, consider that handwritten input is represented by a sequence of observed input strokes $O=O_1 O_2 \ldots O_N$, where $O_n$ is the nth stroke and N denotes the total number of strokes in the expression. A central goal of symbol decoding is to determine the corresponding symbol sequence $\hat{S}$ that has the maximum posterior probability $P(S|O)$ as expressed by:

$$\hat{S} = \underset{S}{\mathrm{argmax}} P(S|O) \quad (1)$$

where $S=S_1 S_2 \ldots S_K$ denotes the sequence of symbols of unknown symbol count K, and $S_k \in \Omega$ for k=1, 2, ... K, and where $\Omega$ represents a symbol set. In the input data, the strokes are mixed together, that is symbol boundaries are unobserved. However, the recognizer uses spatial relation information between temporally consecutive symbols, which is hidden. The best stroke partition and symbol spatial relationships are found for each expression, that is, by looking for the maximum posterior probability $P(S,R,B|O)$ through the possible symbol boundaries $B=\{(b_0=0)<b1<b2<\ldots<(b_K=N)\}$ and symbol spatial relationships $R=r_1 r_2 \ldots r_K$, where $b_k$ indicates the end stroke of symbol k, and $r_k$ denotes the relative spatial position of symbol k to symbol k−1. Equation (1) above thus becomes:

$$\hat{S} = \underset{S}{\mathrm{argmax}} \left\{ \underset{R,B}{\max} P(S, R, B|O) \right\} \quad (2)$$

Also represented in FIG. 1 is a speech input modality, represented by a microphone 120 that generates speech waveforms 122. The waveforms 122 are provided to a speech recognizer 124 coupled to a speech model 126 for recognition. In one implementation, this speech recognition result may be represented as a speech symbol graph. Note that one type of speech recognizer first generates a lattice that is then converted to a speech symbol graph (labeled SSG in FIG. 1), as described below. By way of a more particular example of a suitable speech recognizer, in one implementation a Microsoft Corporation-provided Speech engine/API (SAPI) was used for recognizing speech input into word lattices.

It is noted that typically the input speed of speech is higher than that of handwriting. As a result, the speech data collected during the input of handwritten symbols tends to produce a sequence of isolated words or phrases that are separated by distinct silence. In one example implementation, because of the sparseness of such speech data, the syntax constraints are relatively very loose, and the grammar allowed for mathematical expressions is distinct and limited. Because of these speech properties, a context free grammar is applied. A partial example of context free grammar is shown in the table below:
Partial example of context free grammar:

| | |
|---|---|
| EXPRESSION → | BRACKETED [EXPRESSION] |
| BRACKETED → | [LBRACKET] SYMBOL BRACKETED [RBRACKET] |
| SYMBOL → | OPERANT\|OPERATOR |
| OPERATOR → | PLUS\|MINUS\|TIMES\|DIVIDE |
| LBRACKET → | [left] parenthesis\|bracket |
| RBRACKET → | [right] parenthesis\|bracket |
| OPERANT → | x\|y\|z\|alpha\|beta\|gamma\|NUMBER |
| PLUS → | plus\|add |
| MINUS → | minus\|subtract |
| TIMES → | times\|multiply\|multiplied by |
| DIVIDE → | divide\|divided by |
| NUMBER → | one\|two\|three\|eleven\|twelve\|hundred\|thousand |

In one implementation, the word lattice generated by the speech recognizer 124 is different from the symbol graph generated by the handwriting recognizer 108. A post-processing step is performed to convert the word lattice to a symbol graph by using a lookup table 138 (FIG. 1):
Example partial look-up table for symbol conversion:

| Symbol group | Examples | Possible names |
|---|---|---|
| Digit | 0 . . . 9 | zero . . . nine |
| Operator | +, − | add, subtract |
| Greek | α, β | alpha, beta |
| Function | sin, cos | sine, cosine |
| Other | Σ | sum |
| . . . | | |

Some symbols have more than one pronunciation, for example, the symbol '+' may be pronounced as "add" or "plus". Moreover, some words imply not only certain symbols but also certain structures. For example, the word "squared" means to consider the symbol '2' as a superscript. For this reason, a symbol's identity may be expanded to contain structural information such as "symbol+relation". For those speech words with no spatial relation information, the relation is indicated by an "N" or other suitable indicator.

Thus, as represented by the bimodal recognition system 100 of FIG. 1, a user may provide handwriting and speech data via two independent channels, each of which results in recognizer-provided data, such as corresponding to a graph or data suitable for conversion to a graph. In one example implementation, the user inputs an entire expression via handwriting, and uses speech as an aiding modality. The handwriting symbol graph is then enhanced by any data in the speech symbol graph; note that during the handwriting input period, a user may input speech only for one or more parts of the handwriting input.

As described below, the handwriting recognition results are combined with (enhanced by) speech recognition data by a fusion mechanism 130. The combination results in an output 134, which may be used for subsequent structural analysis, or output as data corresponding to a mathematical expression such as an equation (or part of an expression). The output also may include a set of alternate candidates associated with each symbol, which for example may be used when editing the expression, such as to make any corrections.

As will be understood, in this example the fusion is performed on the decision level (as opposed to fusion on the feature level or modal level). More particularly, in one example implementation, the handwriting recognizer 108 converts the handwriting input to a first symbol graph and the speech recognizer 124 converts the corresponding speech input to a second symbol graph. The second symbol graph is then used to adjust the data (the probabilities represented by the arcs) in the first symbol graph.

In such an implementation, the speech needs to be time-synchronized with the handwriting input so that the speech input correlates with the correct part or parts of the handwritten input. Note that such time-synchronization need not be exact, as a given spoken word or symbol may be completed faster or slower than its counterpart handwritten symbol, and also a spoken word or symbol may slightly lead or lag the start and/or end of its counterpart handwritten symbol. User configurable synchronization parameters may be used to match speech with handwriting according to the individual styles of users. In another implementation, a probability value may be used to indicate the likelihood of a handwritten symbol matching a spoken word. The nearer the distance of these symbols in the time domain, the more likely they are time-synchronized.

To synchronize handwriting and speech, the fusion mechanism 103 obtains the time span ($t^o_{down}$, $t^o_{up}$) of each handwritten stroke o, and the starting time ($t_{start}$) for collecting speech data, such as via associated timestamps in the computing device operating system's data input queues. This allows the fusion mechanism 130 to identify the time range of each symbol.

The recognition results fed to the fusion mechanism 130 thus correspond to first and second symbol graphs with timestamps. In one example implementation described below, the fusion mechanism 130 uses the speech graph to enhance the handwriting graph into the output 134, e.g., an enhanced handwriting graph such as for use in subsequent structural analysis.

Figure 2:
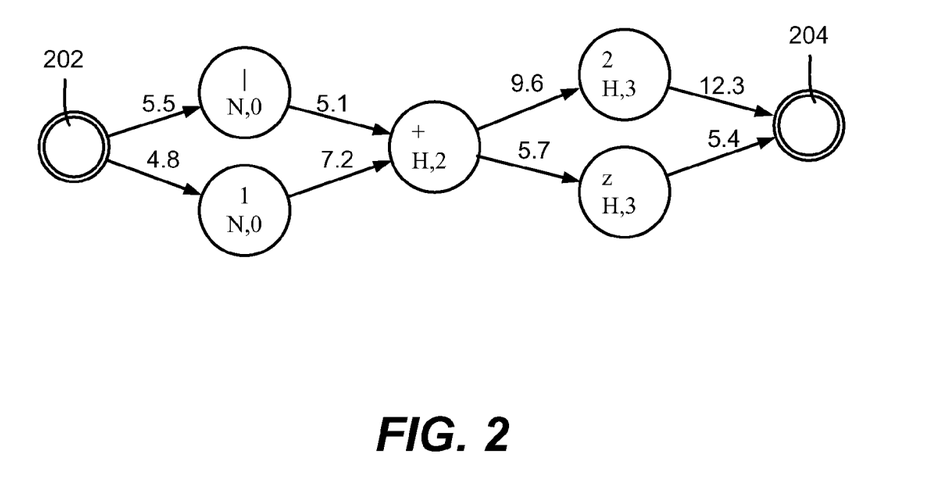
FIG. 2 is a simplified example of a graph that may be produced by a recognizer of a bimodal recognition system.

By way of example, FIG. 2 represents one possible symbol graph 200 for the math equation "1+2", which may have been generated by a handwriting recognizer or a speech recognizer; (a similar graph with different scores is generated by the other type of recognizer, except that it should be noted that the speech graph may be only partial, e.g., the user need not speak for every symbol that is written). The symbol graph 200 has a start indicator (node) 202 and an end indicator (node) 204, which are each unique with respect to other nodes/graphs. Each node in the symbol graph represents a time point and/or symbol, with the start node 202 representing time t=0 and the end node 204 representing time t=T. Each arc between two successive nodes stands for a tuple, which in this example is a (symbol, score) pairing. Each path from the start node to the end node represents a possible symbol sequence (hypothesis) for composing the math equation. A typical symbol graph contains many hypotheses of symbol sequences.

Thus, in the simplified example of FIG. 2, it is seen that two possible symbols have been recognized for the input "1", namely the "l" character and the "1" character. The recognizer provides a probability score from the start node to the symbols' nodes (e.g., 5.5 and 4.8, respectively), and a probability score (e.g., 5.1 and 7.2, respectively) from each of those symbols to the next symbol (or symbols), of which there is only one in this example, namely the "+" operator. For the next handwritten input, which in this example the user intended to be the "2" symbol, two additional candidate symbols have been recognized, namely the "2" character and the "z" character, each with probability scores from the "+" symbol and to the end node 204. As can be seen, further computation can select the best of the four paths (l+2, l+z, 1+2, or 1+z) based on the combined scores along each path.

After the symbol graphs are generated by their respective recognizers, the fusion mechanism 130 (FIG. 1) merges them together. As described above, speech data may not cover the whole expression as a consequence of the flexible way allowed for inputting the speech. Thus, one way to combine the graphs is to fix the topology of handwriting graph while using the speech graph as an enhancement to the handwriting graph probabilities where speech is available. To this end, one possible process enumerates each arc in the speech symbol graph. Then, any matching arcs found in the handwriting graph are enhanced by adjusting their scores based on the speech graph. Note however that because of different meanings for scores in the two symbol graphs resulting from recognition by two different engines, pre-processing steps such as normalization and smoothing may be performed, as represented in FIG. 1 via the blocks labeled NM (normalization mechanism) and SM (smoothing mechanism), respectively, and as described below.

Turning to a consideration of how graphs are fused, a general goal of bimodal symbol recognition is to determine which symbol sequence S is the most likely one intended, given the handwriting observation $O_1$ and speech observation $O_2$; that is $$\hat{S} = \underset{S}{\mathrm{argmax}} P(S \mid O_1, O_2) \qquad (3)$$

In this example, the observations from handwriting and speech are independent. By applying Bayes' theorem and changing the expression to the log domain, Equation (3) is changed to:

$$\hat{S} = \underset{S}{\mathrm{argmax}} \{\alpha \log P(O_1 \mid S) + \beta \log P(O_2 \mid S)\} \qquad (4)$$

where $\alpha$ and $\beta$ correspond to the confidence for each channel, respectively. In one implementation, $\alpha$ may be fixed equal to 1, with $\beta$ adjusted to get the proper results.

With respect to score normalization, in order to merge arc scores of symbol graphs obtained by handwriting and speech recognizers, the meaning of the scores needs to be comparable. In one example, the fusion mechanism 130 calculates an arc posterior probability by using a Forward-Backward (FB) algorithm for both symbol graphs. More particularly, at each node, a forward probability $\alpha$ and a backward probability $\beta$ are calculated as:

$$\alpha_j = \sum_{i \to j} P_{ij} \alpha_i, \quad \beta_i = \sum_{i \to j} P_{ij} \beta_j \qquad (5)$$

where $P_{ij}$ represents the score on the arc connecting node i and node j, $\alpha_i$ is the forward probability of the i-th node. Accordingly, $\beta_i$ is the backward probability of the i-th node.

Figure 3:
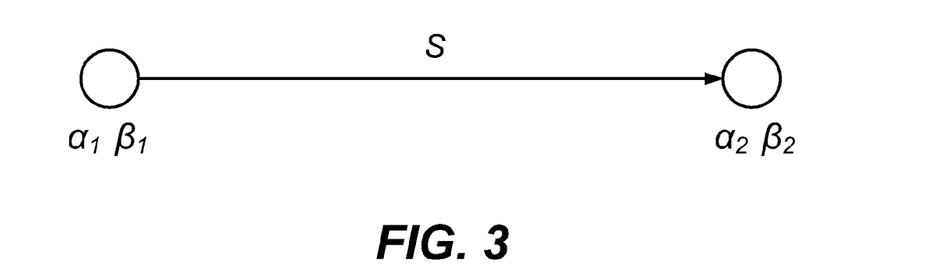
FIG. 3 is an example representation of forward and backward probabilities used in fusing data from different recognizers of a bimodal recognition system into enhanced output.

As represented in FIG. 3 which exemplifies forward and backward probabilities, given a specific arc with score S, the posterior probability (PP) of the arc is defined as:

$$PP = \frac{\alpha_1 S \beta_2}{\alpha_0 \beta_0} \quad (6)$$

where $\alpha_0$ and $\beta_0$ are the forward and backward probabilities of the starting node of the symbol graph.

Figure 4:
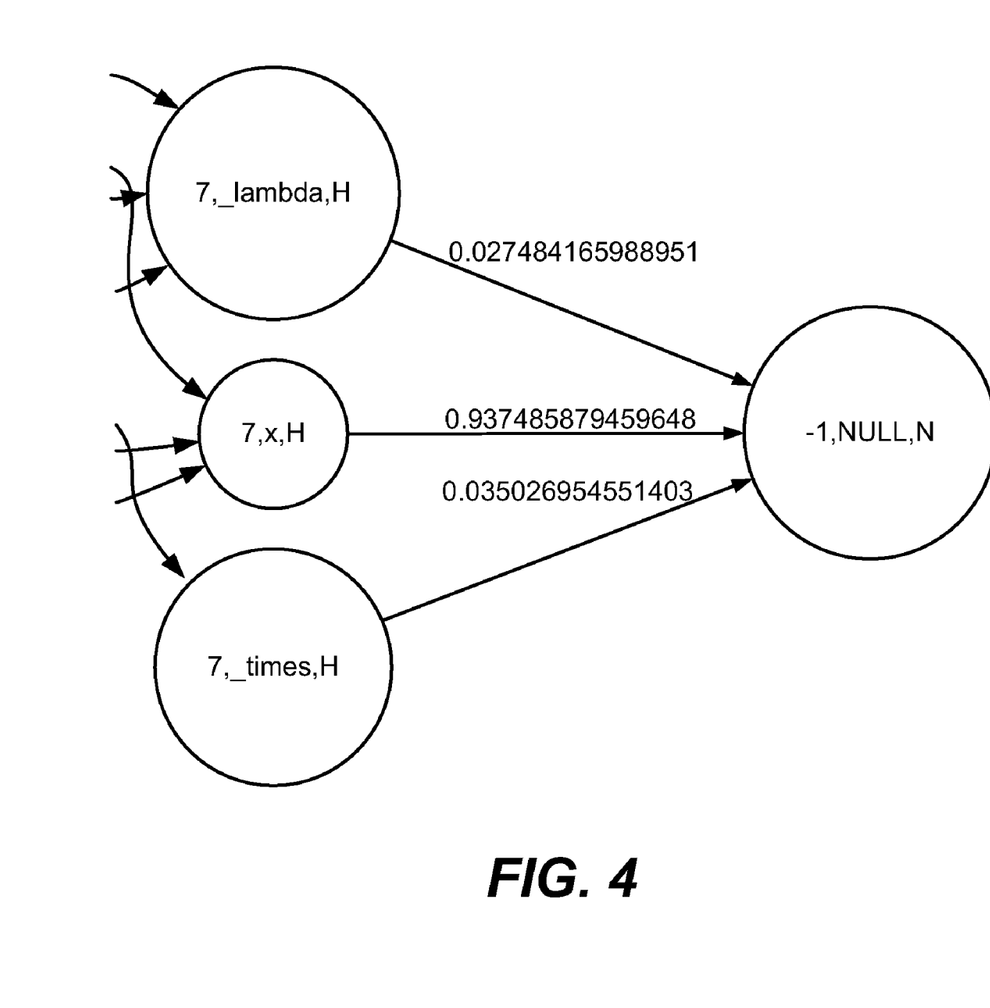
FIG. 4 is an example of a part of a graph that may be produced by a recognizer of a bimodal recognition system.

With respect to score smoothing, after the normalization, some arcs may have a posterior probability close to one while others are close to zero. FIG. 4 is a representation of part of a real handwriting symbol graph in which the three arcs' probability scores sum (substantially close) to one. As can be seen, the center arc has the dominant posterior probability (a score very close to one) which may override any contribution from the speech graph's matching arc or arcs. Similarly, such a dominant probability in the speech graph may introduce over-enhancement.

To prevent such situations, smoothing of the scores in each graph may be performed, e.g., by using a tunable factor κ during the forward-backward and posterior probability computation, such as:

$$\alpha_j = \sum_{i \to j} P_{ij}^\kappa \alpha_i, \; \beta_i = \sum_{i \to j} P_{ij}^\kappa \beta_j, \; PP = \frac{\alpha_1 S^\kappa \beta_2}{\alpha_0 \beta_0} \quad (7)$$

As can be readily appreciated, the smaller the κ value is, the closer together the probability scores are to one another; in one example implementation, a κ value of 0.3 provided good results. Note that after smoothing, the scores are closer together, but the initially highest score is still the highest, the initially next highest the next highest, and so on; further, the smoothed scores still sum (substantially) to one in this example.

Figure 5:
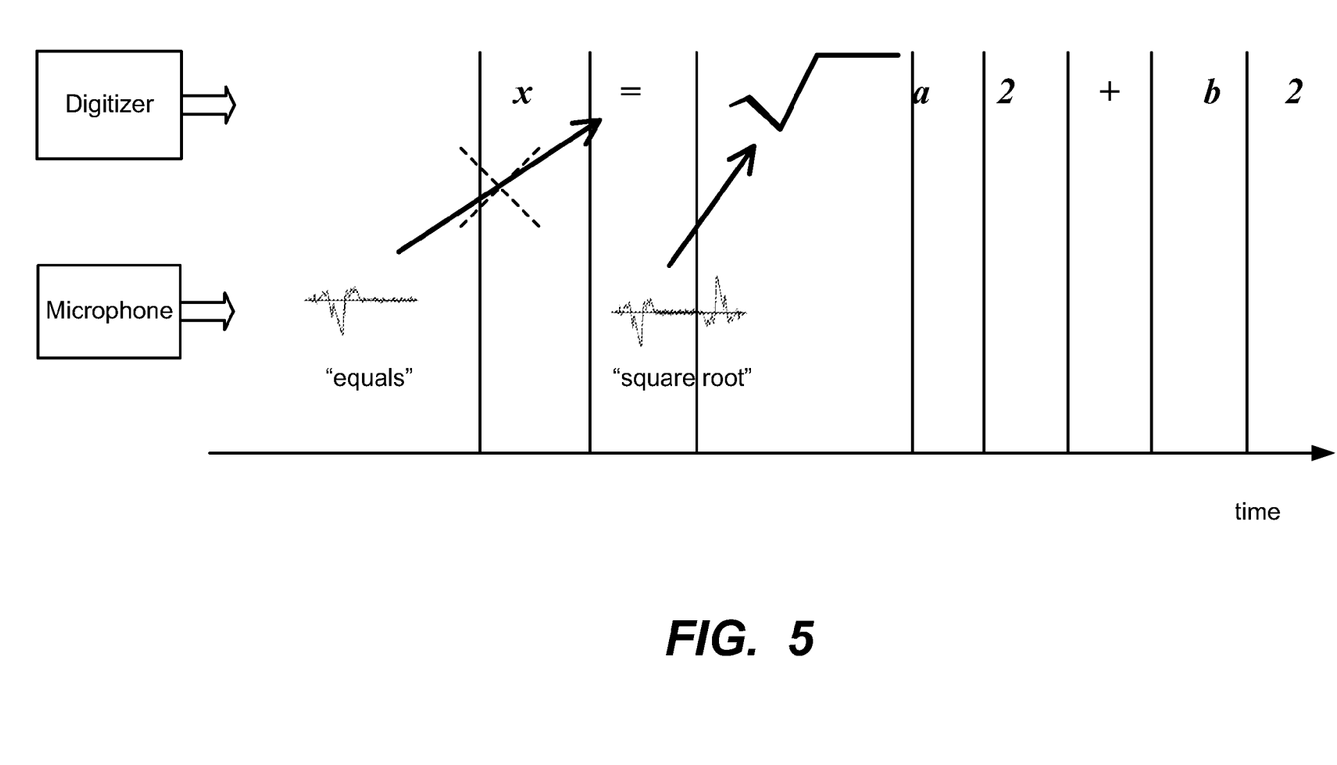
FIG. 5 is a representation of how handwritten symbols are considered in synchronization or not in synchronization with speech input.

With respect to time synchronization, because speech input is optional and may be flexibly input, the time synchronization is relaxed to some extent with respect to aligning arcs in the graphs. For example, two arcs from two symbol graphs may be defined to have the same time alignment if and only if they overlap in time. In most cases, this definition is appropriate, and has been verified as a reasonable definition through empirical testing. By way of example, as illustrated in FIG. 5, the spoken phrase "square root" is slightly ahead of the handwritten input corresponding to the symbol '√', however there is some overlap in time and thus the speech and symbol are considered as synchronized/time aligned. In contrast, the spoken word "equals" is ahead of the handwritten input corresponding to the symbol '=' by more than one symbol, and thus the speech for the word "equals" is considered irrelevant, (as indicated by the dashed x-out over the arrow relating "equals" to "=" in FIG. 5). Note that the above definition may be confusing at times, such as when writing more than one identical symbol in succession, or for users that lag or lead with their speech relative to their handwriting. However, as described above, user configurable parameters may customize the time alignment definition for users.

Further, in one alternative, instead of considering non-time aligned speech as irrelevant, the time alignment between speech and handwritten ink may be used as a factor when fusing the graphs. For example, the better the alignment, the more weight that speech may be given when enhancing the handwriting graph with the speech graph; the lesser the alignment, the less weight.

Figure 6:
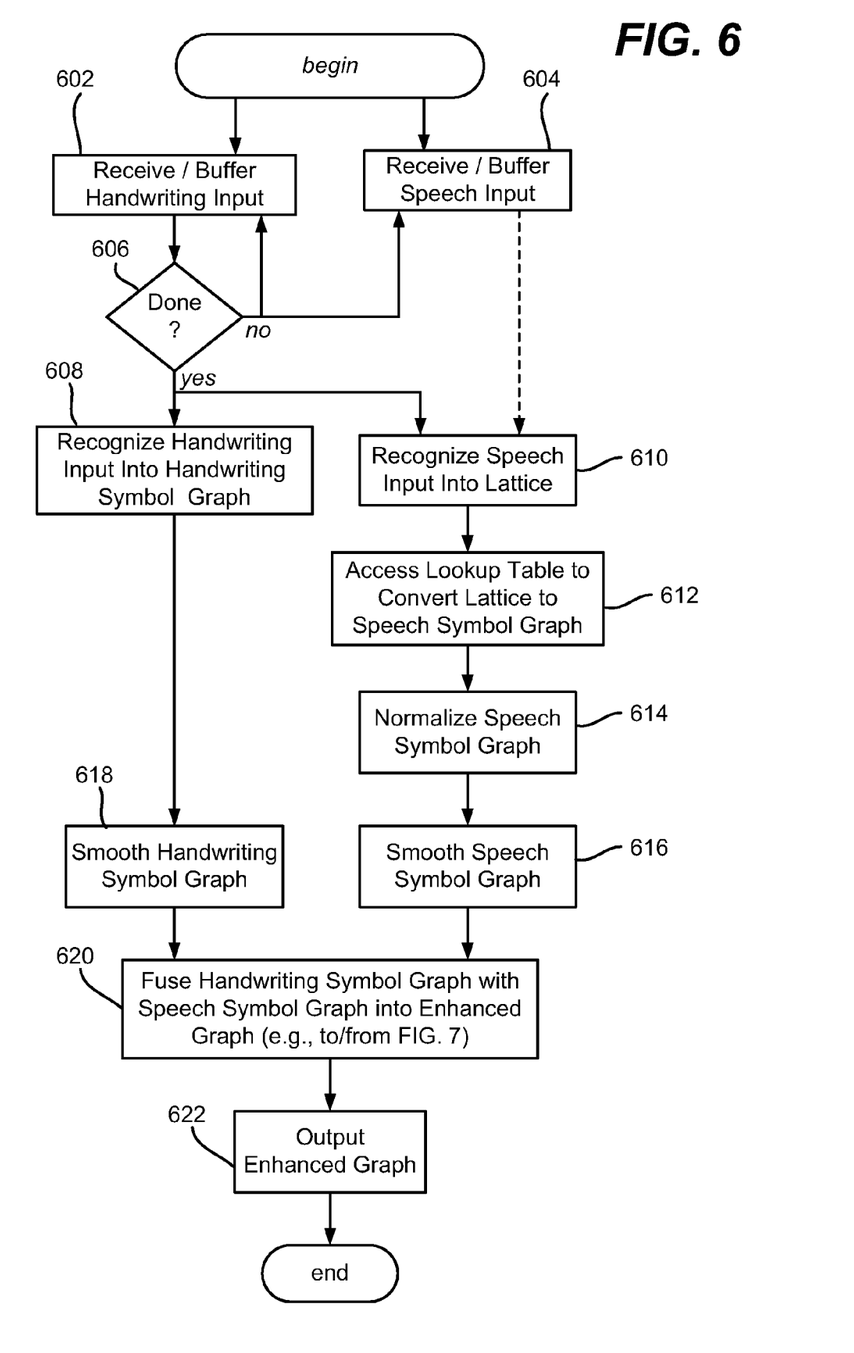
FIG. 6 is a flow diagram representing example steps in a bimodal recognition process.

FIG. 6 summarizes an example overall bimodal recognition process, beginning at steps 602 and 604 which represent handwriting and/or speech being received, respectively, in parallel. Note that as described below, parallel input is not required, as for example the speech may be received at a later time, such as when editing previously recognized results, whereby step 604 may occur at a later time, with the speech input data realigned in time with corresponding handwritten input data via an alignment process or the like.

In this example, because handwriting is the primary entry mode, a "pen-down" or the like starts the process. The receiving of handwriting and/or speech input continues (as represented via the "no" branch of step 606) until the user is done, that is, finishes handwriting in some way, such as detected by a button tap, a gesture, by changing to a different input writing area, by a pen-up condition that lasts a certain duration, and so on. However, it is feasible to employ a mechanism where the user speaks an indication of being done, such as by saying "recognize" or another such word that is not likely to be confused with a symbol.

The handwriting recognition (step 608) and speech recognition (step 610) may be performed in parallel, although serial recognition is an alternative. As described above, the speech recognition may result in a lattice, which as represented via step 612, may be converted via a lookup table or the like into a graph. Step 614 represents normalizing the speech symbol graph so as to correspond to the handwriting graph, although as can be readily appreciated, it is equivalent to instead normalize the handwriting graph, or normalize both to some instead so as to correspond with one another.

Steps 616 and 618 represent smoothing the speech graph's scores and handwriting graph's scores, respectively. As described above, this reduces the possibility of one graph's scores having too much influence on the other graph's scores.

Step 620 represents the fusion of the two graphs into an enhanced graph, an example of which is described below with reference to FIG. 7. Following fusion, step 622 represents outputting the enhanced graph for use in some way, e.g., for structural analysis, and/or for computing the best score or scores to produce a recognition result set.

Figure 7:
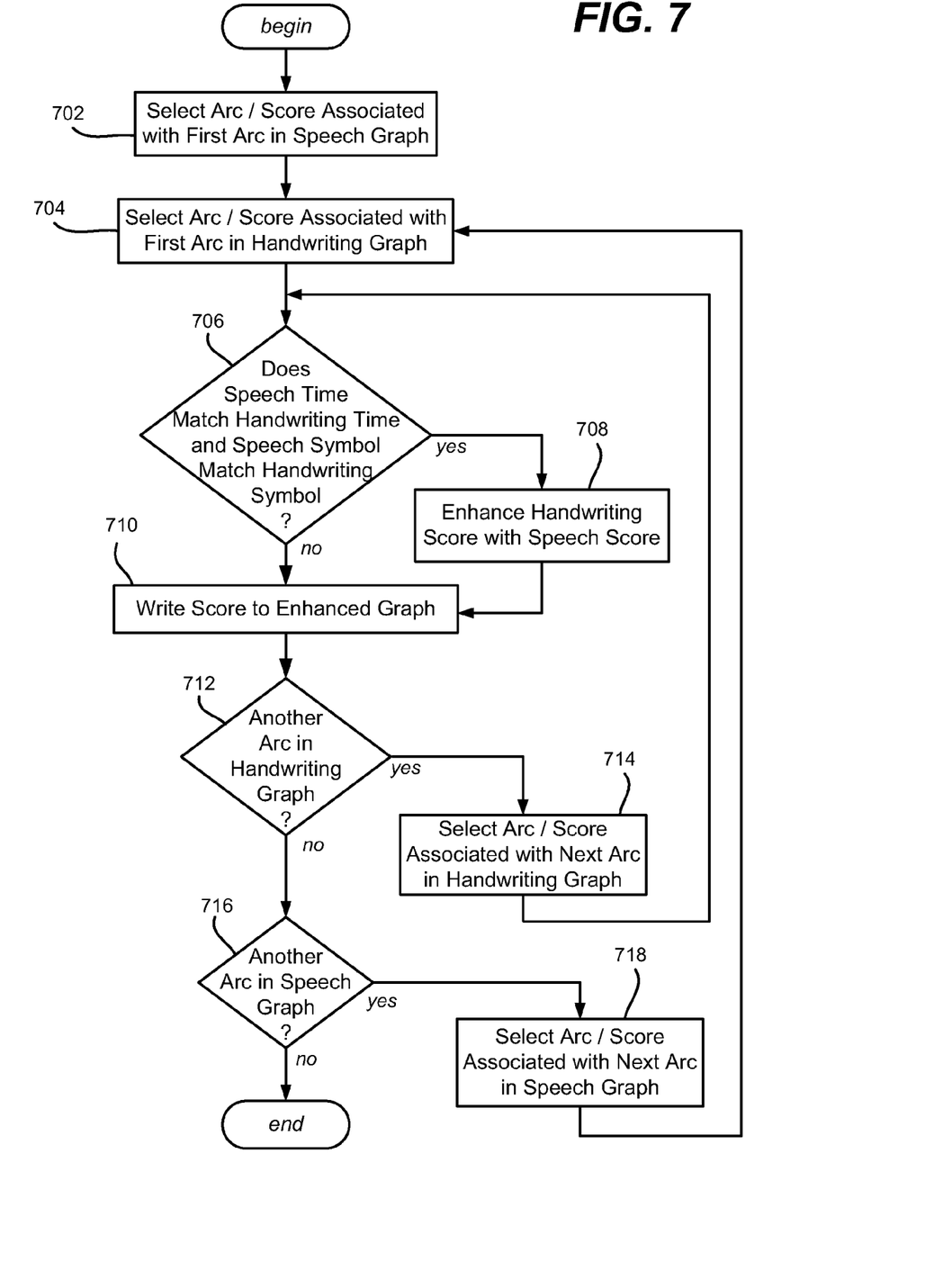
FIG. 7 is a flow diagram representing example steps in fusing graphs provided via a bimodal recognition process into an enhanced graph.

FIG. 7 represents the fusion process for one example fusion algorithm, and in general corresponds to the pseudo code set forth below:

```
for (each arc pAsr in speech graph)
{
    for (each arc pHwr in handwriting graph)
    {
        if(pAsr.Time == pHwr.Time && pAsr.Symbol == pHwr.Symbol)
        {
            pHwr.Score += beta * pAsr.Score;
        }
    }
}
```

In general, as represented by steps 702 and 704 of FIG. 7, the arcs are walked through in pairs, one from each graph, by selecting an arc from the speech graph and evaluating that arc against each of the arcs in the handwriting graph to determine whether each such pairing can be used for enhancement purposes. If the arcs' timing matches and their symbols match as evaluated at step 706, (shown as needing to be equal in the pseudo code for brevity, but a match only needs be within a certain closeness), then the speech score is used to enhance the handwriting score at step 708. A weight factor may be used, e.g., as set forth in the pseudo code, the handwriting score is increased by the result of the speech score times beta, a speech weight factor (e.g., 2.1 was an appropriate factor in one implementation).

Step 710 writes the score to a corresponding arc in the enhanced graph, whether as is (non-enhanced) or enhanced via step 708. Steps 712 and 714 repeat the comparison process and possible enhancement for other arcs in the handwriting graph. Steps 716 and 718 repeat the comparison process for other arcs in the speech graph. Note that it is generally equivalent to have the speech arc selection correspond to the inner loop with the handwriting arc selection corresponding to the outer loop.

Further, it may be possible to "short circuit" and exit the inner loop early (and/or enter the inner loop later than the first arc). For example, by progressing through the arcs in time order in the handwriting graph and detecting (e.g., as part of a modified step 712) a state at which any later arcs in the handwriting graph cannot possibly meet the timing match requirement with the currently selected speech arc, the inner loop may be exited at this time, as if no further handwriting graph arcs remained to compare against the currently selected speech graph arc. Similarly, rather than always selecting the first handwriting arc at step 704, earlier handwriting graph arcs that cannot possibly meet the timing match with the currently selected speech graph arc may be skipped over.

After this processing, the handwriting symbol graph has been rescored into an enhanced graph output 134 (FIG. 1). At this time, further processing may be performed on the output, e.g., structural analysis, computation of the best path corresponding to the highest score in the symbol graph to provide a corresponding symbol sequence, and so forth. Multiple paths may be extracted and ranked to provide a user with alternative sequences and/or symbols, such as if needed for editing to correct mistakes.

Other aspects of bimodal recognition may provide valuable benefits to users. For example, as mentioned above, a user may use subsequently-provided speech to edit existing handwritten recognition results. More particularly, if the handwriting graph is maintained (or regenerated as needed from the electronic ink), and the user goes back and selects a portion of electronic ink or the recognized results from that ink (typically but not necessarily a single symbol), corresponding locations in the handwriting graph may be determined. A user may then speak, intending to make one or more corrections for example, but in actuality enhancing the handwriting graph with speech input that results in one or more changes being made, e.g., by choosing a path having at least one different candidate symbol. In essence, the user is selecting a portion of an expression to edit, and that selection may be used to time align the handwriting graph with the speech graph, even though the speech is input at a later time. Note that in a post-recognition editing mode, the handwriting scores may be biased so as to favor at least one change, e.g., a user requesting a change likely does not want the same symbol or set of symbols to be returned following subsequent recognition.

In another aspect, not only may handwriting recognition be enhanced with speech, but speech may be used to insert solely speech-recognized symbols into a set of handwritten symbols. For example, if a user is writing a mathematical expression but cannot remember how to write a particular symbol, the user can indicate to the system to use speech only, such as by tapping a special button, making a gesture, entering a special "unknown" symbol, and so forth. The user may then speak the name of the symbol, and thereafter continue entering handwriting, accompanied by speech as desired. With only a slight modification to an existing handwriting recognizer (e.g., to recognize an additional, special symbol or gesture), the resultant handwriting graph may contain a special symbol node. The fusion mechanism detects such a special node when enhancing the handwriting graph, and instead of using the speech to enhance the scores associated with that node, substitutes the highest probability symbol from the speech graph, (and possibly also adjusts scores associated with that node).

In another aspect, while the above-exemplified fusion mechanism provides significant improvements over handwriting or speech recognition accuracy when operated separately, further enhancements may be provided. For example, a spoken waveform for a symbol may be recognized as another symbol which has similar pronunciation, (e.g., "8" and "A", "B" and "V"), particularly in noisy environments. However, although the misrecognized symbol may be similar to the correct symbol with respect to speech, there may be no such similarity in handwriting. This lack of handwriting similarity (e.g., "B" is very unlikely to be confused by "V" when written) may be used to selectively reduce problems resulting from errors in speech recognition.

More particularly, a confusion class list 140 (FIG. 1, denoted by a dashed block to generally emphasize its optional usage) that identifies symbol similarities that occur in pronunciation may be used to enhance handwriting recognition scores. In one example, such a list may be obtained via a partially automatic method; for example, Kullback-Leibler Divergence (KLD) between the acoustic Hidden Markov Models (HMMs) of symbols may be calculated. Further, human knowledge may be used to add to, delete from, and/or modify the confusion class list 140.

With the list 140, once in the comparison stage (e.g., at step 706 of FIG. 7), the list 140 may be consulted regarding whether a speech-recognized symbol and a handwriting-recognized symbol may actually match as a result of a speech recognition error. For example, if two or more symbols are in the same confusion class, one may be substituted for one another in the comparison so that the handwritten score may be enhanced. As a more particular example, if the confusion class includes "8" and "A", the speech-recognized symbol is "8" and one handwriting-recognized symbol is "A", a match is found by substituting "A" from the confusion class for "8" thus satisfying the matching requirements. In essence, with such an enhancement step 706 may be rewritten as "Does . . . Speech Symbol or a Confusion Class Symbol Match Handwriting Symbol?" Note that the weight given to a speech arc when enhancing a handwritten-recognized symbol score may be lower when using a confusion-class substituted symbol than when using an exactly matching symbol, for example.

As can be seen, a fusion mechanism such as employing graph comparison and enhancement may be used to improve symbol recognition accuracy by helping determine a user's intent, particularly with respect to written symbols that are difficult for handwriting recognizers to differentiate. Experiments have shown relative accuracy improvements on the order of nearly twenty percent.

Exemplary Operating Environment

Figure 8:
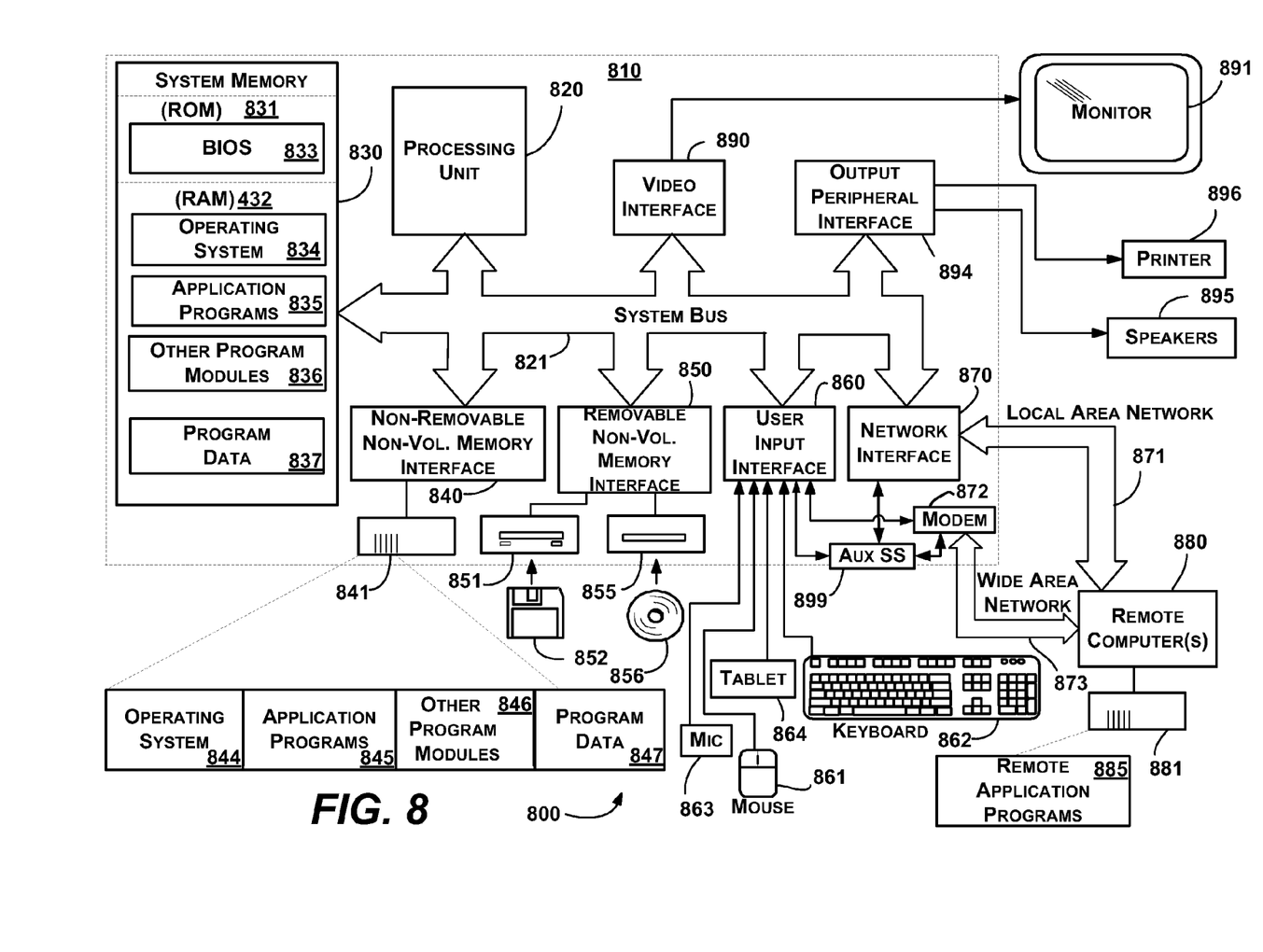
FIG. 8 shows an illustrative example of a computing environment into which various aspects of the present invention may be incorporated.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computer-readable storage devices having computer-executable instructions, which when executed by one or more processing devices, cause the one or more processing devices to perform:
   receiving handwriting input including handwritten mathematical symbols;
   receiving speech input including spoken words corresponding to spoken mathematical symbols;
   recognizing the handwriting input to identify candidate handwritten mathematical symbols;
   recognizing the speech input to identify candidate spoken words;
   processing the candidate handwritten mathematical symbols into a handwriting graph including nodes representing the candidate handwritten mathematical symbols and arcs representing probabilities that the candidate handwritten mathematical symbols are correct;
   processing the candidate spoken words into a speech graph by:
      accessing a lookup table with the candidate spoken words recognized from the speech input to identify candidate spoken mathematical symbols; and
      including nodes in the speech graph representing the candidate spoken mathematical symbols and arcs representing probabilities that the candidate spoken mathematical symbols identified from the lookup table are correct; and
   enhancing the handwriting graph into an enhanced graph by adjusting individual probabilities in the handwriting graph based on individual matching probabilities in the speech graph.

2. The one or more computer-readable storage devices of claim 1 wherein recognizing the speech input comprises generating a word lattice that includes the candidate spoken words, and the word lattice is converted into the speech graph.

3. The one or more computer-readable storage devices of claim 1 having further computer-executable instructions, which, when executed by one or more processing devices, cause the one or more processing devices to perform:
   performing symbol matching and time-alignment matching to identify the individual matching probabilities in the speech graph.

4. The one or more computer-readable storage devices of claim 1 having further computer-executable instructions which when executed by the one or more processing devices, cause the one or more processing devices to perform:
   outputting the enhanced graph from which a mathematical expression is computed.

5. The one or more computer-readable storage devices of claim 1, wherein the lookup table comprises a first word and a second word that both identify an individual candidate spoken mathematical symbol.

6. The one or more computer-readable storage devices of claim 5, the first word comprising the word "plus," the second word comprising the word "add," and the individual candidate spoken mathematical symbol comprising the symbol "+."

7. A method comprising:
   receiving handwriting input including handwritten mathematical symbols;
   receiving speech input including a spoken word corresponding to a spoken mathematical symbol;
   recognizing the handwriting input to identify candidate handwritten mathematical symbols;
   recognizing the speech input to identify a candidate spoken word; processing the candidate handwritten mathematical symbols into a handwriting graph reflecting probabilities, represented by arcs, that the candidate handwritten mathematical symbols, represented by nodes, correctly identify the handwritten mathematical symbols;
   processing the candidate spoken word by:
      accessing a lookup table with the candidate spoken word recognized from the speech input to identify a candidate spoken mathematical symbol; and
      generating a speech graph reflecting a probability, represented by an arc, that the candidate spoken mathematical symbol, represented by a node, correctly identifies the spoken mathematical symbol; and fusing the handwriting graph and the speech graph to create an enhanced graph by adjusting individual probabilities of the handwriting graph based on individual matching probabilities in the speech graph,
wherein at least the fusing is performed by a processing device.

8. The method according to claim 7, wherein the lookup table comprises a second word that also identifies the candidate spoken mathematical symbol.

9. The method according to claim 8, the candidate spoken word comprising the word "plus," the second word comprising the word "add," and the candidate spoken mathematical symbol comprising the symbol "+."

10. The method of claim 7, wherein recognizing the speech input comprises generating a word lattice that includes the candidate spoken word and converting the word lattice into the speech graph.

11. The method of claim 7, further comprising:
performing symbol matching and time-alignment matching to identify the individual matching probabilities in the speech graph.

12. The method of claim 7, further comprising:
outputting the enhanced graph, from which a mathematical expression is computed.

13. A system comprising:
a handwriting recognizer configured to:
  receive handwriting input including handwritten mathematical symbols;
  recognize the handwriting input to identify candidate handwritten mathematical symbols; and
  generate a handwriting graph reflecting probabilities, represented by arcs, that the candidate handwritten mathematical symbols, represented by nodes, correctly identify the handwritten mathematical symbols;
a speech recognizer configured to:
  receive speech input including a spoken word corresponding to a spoken mathematical symbol;
  recognize the speech input to identify a candidate spoken word;
  access a lookup table with the candidate spoken word recognized from the speech input to identify a candidate spoken mathematical symbol; and
  generate a speech graph reflecting a probability, represented by an arc, that the candidate spoken mathematical symbol, represented by a node, correctly identifies the spoken mathematical symbol;
a fusion mechanism configured to fuse the handwriting graph and the speech graph to create an enhanced graph by adjusting individual probabilities of the handwriting graph based on individual matching probabilities in the speech graph; and
at least one processing device configured to execute the handwriting recognizer, the speech recognizer, or the fusion mechanism.

14. The system of claim 13, wherein the speech recognizer is configured to recognize the speech input by generating a word lattice that includes the candidate spoken word and converting the word lattice into the speech graph.

15. The system of claim 13, wherein the fusion mechanism is further configured to perform symbol matching and time-alignment matching to identify the individual matching probabilities in the speech graph.

16. The system of claim 13, wherein the fusion mechanism is further configured to output the enhanced graph, from which a mathematical expression is computed.

17. The system of claim 13, wherein the lookup table comprises a second word that also identifies the candidate spoken mathematical symbol.

18. The system of claim 17, the candidate spoken word comprising the word "plus," the second word comprising the word "add," and the candidate spoken mathematical symbol comprising the symbol "+."

* * * * *